(12) United States Patent
Tran

(10) Patent No.: US 7,716,581 B2
(45) Date of Patent: May 11, 2010

(54) PATENT OPTIMIZER

(76) Inventor: Bao Q. Tran, 6768 Meadow Vista Ct., San Jose, CA (US) 95135

( * ) Notice: Subject to any disclaimer, the term of this patent is extended or adjusted under 35 U.S.C. 154(b) by 1059 days.

(21) Appl. No.: 11/405,323

(22) Filed: Apr. 17, 2006

(65) Prior Publication Data

US 2006/0190807 A1 Aug. 24, 2006

Related U.S. Application Data

(63) Continuation of application No. 09/792,828, filed on Feb. 24, 2001, now abandoned.

(60) Provisional application No. 60/185,644, filed on Feb. 29, 2000.

(51) Int. Cl.
*G06F 17/00* (2006.01)

(52) U.S. Cl. .................. 715/273; 715/234; 705/26; 709/238

(58) Field of Classification Search .................. 715/256, 715/209, 230–231, 253–255, 273, 713, 764, 715/851
See application file for complete search history.

(56) References Cited

U.S. PATENT DOCUMENTS

| 5,043,891 A | | 8/1991 | Goldstein |
| 5,297,039 A | * | 3/1994 | Kanaegami et al. ............ 707/5 |
| 5,418,951 A | | 5/1995 | Damashek |
| 5,623,679 A | | 4/1997 | Rivette et al. |
| 5,623,681 A | | 4/1997 | Rivette et al. |
| 5,729,751 A | | 3/1998 | Schoolcraft |
| 5,754,840 A | * | 5/1998 | Rivette et al. ................. 707/2 |
| 5,774,833 A | * | 6/1998 | Newman ....................... 704/9 |
| 5,799,325 A | | 8/1998 | Rivette et al. |
| 5,806,079 A | | 9/1998 | Rivette et al. |
| 5,809,318 A | | 9/1998 | Rivette et al. |
| 5,835,900 A | | 11/1998 | Fagg |
| 5,845,301 A | | 12/1998 | Rivette et al. |
| 5,845,303 A | | 12/1998 | Templeman |
| 5,950,214 A | | 9/1999 | Rivette et al. |
| 5,991,751 A | | 11/1999 | Rivette et al. |
| 5,991,780 A | | 11/1999 | Rivette et al. |
| 5,999,664 A | | 12/1999 | Mahoney et al. |
| 6,014,663 A | | 1/2000 | Rivette et al. |
| 6,018,749 A | | 1/2000 | Rivette et al. |
| 6,049,811 A | * | 4/2000 | Petruzzi et al. ............. 715/507 |
| 6,151,598 A | | 11/2000 | Shaw et al. |
| 6,185,684 B1 | | 2/2001 | Pravetz et al. |
| 6,263,314 B1 | * | 7/2001 | Donner ......................... 705/1 |
| 6,298,327 B1 | * | 10/2001 | Hunter et al. .................. 705/1 |
| 6,339,767 B1 | | 1/2002 | Rivette et al. |
| 6,343,580 B2 | | 2/2002 | Uchida |

(Continued)

OTHER PUBLICATIONS

"Telecommunications Standardization and Intellectual Property Rights: A Fundamental Dilemma"—Schurmer et al. Jun. 1995-Standard View vol. 3 pp. 50-59.*

*Primary Examiner*—Doug Hutton
*Assistant Examiner*—Quoc A Tran
(74) *Attorney, Agent, or Firm*—Tran & Associates

(57) ABSTRACT

Systems and methods are disclosed to analyze a patent document by receiving patent application text including background, description of drawings, description and claims; generating a claim chart showing claim dependencies; checking for antecedent, support in drawings, support in the description; generating a navigable claim hierarchy; and generating a diagnostic message for the patent document.

15 Claims, 11 Drawing Sheets

U.S. PATENT DOCUMENTS

| | | |
|---|---|---|
| 6,389,434 B1 | 5/2002 | Rivette et al. |
| 6,401,118 B1 | 6/2002 | Thomas |
| 6,434,580 B1 * | 8/2002 | Takano et al. ............... 715/530 |
| 6,499,026 B1 | 12/2002 | Rivette et al. |
| 6,549,894 B1 | 4/2003 | Simpson et al. |
| 6,556,992 B1 | 4/2003 | Barney et al. |
| 6,574,645 B2 * | 6/2003 | Petruzzi et al. ............. 715/255 |
| 6,662,178 B2 | 12/2003 | Lee |
| 6,694,331 B2 | 2/2004 | Lee |
| 2001/0047329 A1 | 11/2001 | Ashby |
| 2002/0002523 A1 | 1/2002 | Kossovsky et al. |
| 2002/0002524 A1 | 1/2002 | Kossovsky et al. |
| 2002/0004775 A1 | 1/2002 | Kossovsky et al. |
| 2002/0010682 A1 | 1/2002 | Johnson |
| 2002/0042784 A1 | 4/2002 | Kerven et al. |
| 2002/0042791 A1 | 4/2002 | Smith et al. |
| 2002/0052928 A1 | 5/2002 | Stern et al. |
| 2002/0055935 A1 | 5/2002 | Rosenblum |
| 2002/0059076 A1 | 5/2002 | Grainger et al. |
| 2002/0065676 A1 | 5/2002 | Grainger et al. |
| 2002/0065677 A1 | 5/2002 | Grainger et al. |
| 2002/0073074 A1 | 6/2002 | Sweet et al. |
| 2002/0091541 A1 | 7/2002 | Lundberg |
| 2002/0091542 A1 | 7/2002 | Grainger |
| 2002/0093528 A1 | 7/2002 | Grainger |
| 2002/0099694 A1 | 7/2002 | Diamond et al. |
| 2002/0099695 A1 | 7/2002 | Abajian et al. |
| 2002/0099696 A1 | 7/2002 | Prince |
| 2002/0099697 A1 | 7/2002 | Jensen-Grey |
| 2002/0099731 A1 | 7/2002 | Abajian |
| 2002/0099737 A1 | 7/2002 | Porter et al. |
| 2002/0103654 A1 | 8/2002 | Poltorak |
| 2002/0103920 A1 | 8/2002 | Berkun et al. |
| 2002/0111824 A1 | 8/2002 | Grainger |
| 2002/0111953 A1 | 8/2002 | Snyder |
| 2002/0114522 A1 | 8/2002 | Seeber |
| 2002/0116363 A1 | 8/2002 | Grainger |
| 2002/0116466 A1 | 8/2002 | Trevithick et al. |
| 2002/0123988 A1 | 9/2002 | Dean et al. |
| 2002/0124053 A1 | 9/2002 | Adams et al. |
| 2002/0133481 A1 | 9/2002 | Smith et al. |
| 2002/0138297 A1 | 9/2002 | Lee |
| 2002/0138465 A1 | 9/2002 | Lee |
| 2002/0138474 A1 | 9/2002 | Lee |
| 2002/0138475 A1 | 9/2002 | Lee |
| 2002/0152261 A1 | 10/2002 | Arkin et al. |
| 2002/0152262 A1 | 10/2002 | Arkin et al. |
| 2002/0161603 A1 | 10/2002 | Gonzales |
| 2002/0161680 A1 | 10/2002 | Tarnoff |
| 2002/0161733 A1 | 10/2002 | Grainger |
| 2002/0165986 A1 | 11/2002 | Tarnoff |
| 2002/0169854 A1 | 11/2002 | Tarnoff |
| 2002/0178015 A1 | 11/2002 | Zee |
| 2002/0178229 A1 | 11/2002 | Sinha et al. |
| 2002/0184234 A1 | 12/2002 | Lundberg |
| 2003/0004936 A1 | 1/2003 | Grune et al. |
| 2003/0004966 A1 | 1/2003 | Bolle et al. |
| 2003/0009471 A1 | 1/2003 | Hashizume |
| 2003/0050967 A1 | 3/2003 | Bentley |
| 2003/0050977 A1 | 3/2003 | Puthenkulam |
| 2003/0074354 A1 | 4/2003 | Lee et al. |
| 2003/0083898 A1 | 5/2003 | Wick et al. |
| 2003/0158855 A1 | 8/2003 | Farnham et al. |
| 2003/0167181 A1 | 9/2003 | Lundberg et al. |
| 2003/0167324 A1 | 9/2003 | Farnham et al. |
| 2003/0172020 A1 | 9/2003 | Davies et al. |
| 2003/0182141 A1 | 9/2003 | Wiedemann et al. |
| 2003/0187874 A1 | 10/2003 | Peschel et al. |
| 2003/0196172 A1 | 10/2003 | Bates et al. |
| 2003/0208624 A1 | 11/2003 | Grossman |
| 2003/0233348 A1 | 12/2003 | Franklin |
| 2004/0002892 A1 | 1/2004 | Gluck et al. |
| 2004/0006543 A1 | 1/2004 | Twining |
| 2004/0039668 A1 | 2/2004 | Lundberg |
| 2004/0041836 A1 | 3/2004 | Zanner et al. |
| 2004/0049495 A1 | 3/2004 | Lee et al. |
| 2004/0059994 A1 | 3/2004 | Fogel et al. |
| 2004/0068527 A1 | 4/2004 | Smith |
| 2004/0205542 A1 | 10/2004 | Bargeon et al. |
| 2005/0138006 A1 | 6/2005 | Bennett et al. |

* cited by examiner

PATENT OPTIMIZER

This application is a continuation of and claims priority to Provisional Application Ser. No. 60/185,644, filed Feb. 29, 2000 and to U.S. application Ser. No. 09/792,828, filed Feb. 24, 2001 now abandoned, the contents of which are incorporated herewith.

BACKGROUND

The invention relates to systems, methods and techniques for processing intellectual property assets.

To compete more effectively at Internet speed, organizations are delivering relevant information and providing increasingly sophisticated and time-sensitive services to a rapidly expanding audience, including employees, customers, suppliers and partners both inside and outside the traditional enterprise. Many organizations have extended their business over the Internet to directly reach a large number of geographically dispersed end-users. Due to the speed at which new ideas and concepts propagate over the Internet, these e-business initiatives require greatly shortened the time necessary to procure and to perfect the protection of new concepts and technology using intellectual property (IP) laws.

Among the domains of IP laws (patents, trademarks, trade secrets, and copyrights), the procurement of patent rights is one of the most challenging processes. The resulting patent, if properly procured, can be highly valuable as it grants exclusivity on the new idea or technology to an applicant for IP rights. According to statistics from the U.S. Patent and Trademark Office, utility applications to the U.S. Patent Office for all applicants worldwide ranged from 95,000 to 102,000 between 1965 and 1976, and from 153000 to 243,000 applications between 1989 and 1998. The increase in patent applications is due in part to improvements in the management of research and development programs, and further in part to the realization that intellectual assets such as patents are commercially valuable. There's real power in patents, and real money:

Minolta is expected to pay $127.5 million dollars to Honeywell for infringing a patent on automatic camera focusing; Motorola is expected to pay $33 million dollars to Power Integration for infringing a patent on a power IC; Texas Instruments has earned more then one billion dollars in royalties since 1986, and it expects more to come on its Japanese patent for the integrated circuit; and IBM has been licensing its patents for money as well as over one billion dollars of business relationships where licensees enter into large purchase commitments for IBM products.

Due to the complexity of the process and the potential loss in value to the IP from to errors in procuring the IP, the applicant typically relies on an IP specialist such as a registered patent attorney. The IP specialist plays an important role in assisting applicants understand patent laws and in developing strategies for maximizing the value of intellectual property under those laws. The IP attorney can ensure that those strategies are implemented when patent applications are prepared. The IP attorney is typically an expert in writing (drafting) patent claims and in negotiating the wording (and, hence, scope) of those claims during the prosecution of the patent application. However, due to the amount of training required to understand both technical and legal matters, IP attorneys are in short supply. Moreover, since every application is unique and requires the applicant to educate the IP attorney, the process can become lengthy and expensive.

To illustrate, patents are obtained by conducting a negotiation with the national patent office in which the patent application was filed. The process is called "prosecution" of the patent and can extend over an 18-month to two-year period, or longer. The first step in the process is the generation and filing of a complete patent application in a national patent office such as the United States Patent & Trademark Office (US PTO).

The generation of a patent application is a fairly complicated matter, since the application must adhere to certain criteria and standards of the US PTO. The patent application generally includes a specification and claims. The specification must be enabling and must describe the invention "in such full, clear, concise, and exact terms as to enable any person skilled in the art . . . to make and use" the invention without undue experimentation. 35 U.S.C. §112. The claims must particularly point out and distinctly claim what the applicant regards as the invention and must satisfy the statutory requirement that the claimed invention has utility and qualifies as patentable subject matter. Moreover, drawings may be required where necessary to understand the claimed subject matter. These drawings need to conform to highly specific Patent Office requirements. Additionally, certain procedural steps, if done properly and in a timely manner, can minimize costs, facilitate prosecution, and be the best insurance against having a patent invalidated in litigation.

Once filed, the applicant can expect that, in the first office action "on the merits of the application," an examiner from the national patent office will likely reject all of the claims and provide grounds for each rejection and reasons why each and every claim appears to be unpatentable. The applicant in turn responds to the rejections by arguing why they are incorrect and/or by amending the application (most likely the claims) to avoid the rejections. The examiner considers the response/amendment submitted by the applicant and then issues a second Office action. In the second Office action, it is not unusual for the examiner to make a "final rejection" of some or all of the claims. Upon receipt of a final rejection, the only options available to the applicant are to adopt changes in the rejected claims suggested by the examiner (if any are suggested), to appeal the examiner's decision to the Board of Patent Appeals and Interferences or to abandon the application, if the examiner has not allowed any claims.

Historically, inventors use the services of patent agents or attorneys who can put an application in a proper format for submission. However, increased demand for the services of these agents and attorneys, combined with a limited supply of patent agents and attorneys, has caused costs for patent applications to spiral upward. Further, the average pendency for drafting patent applications has also increased due to the increased workloads on the agents and attorneys. To reduce delays, certain patent professionals have culled their client base and focus on serving large or well-funded corporate clients.

To cut cost and/or to speed up the application process, patent applications can be prepared, filed and prosecuted by applicants who are not represented by a patent attorney (pro se applicants). To serve this market, a number of how-to books and software templates have evolved. However, the how-to books require users to spend valuable time learning the never-ending complexity of the IP legal system. Software templates provide a series of examples for a user to follow in completing an application. However, these templates tend to be too simplistic and essentially present only the major parts of the application to the user. However, the user is left on his own in completing the application. These templates do not actively check mistakes that a novice can make, and they can't assist users in responding to rejections from the patent office.

Due to the complexity of the entire process from filing to negotiating with examiners well versed in the patenting process as well as the prior art, the filing or prosecution of patent applications on a "pro se" basis is not recommended for inventors who have not had years of experience in such patent application drafting and an aptitude for the complex legal work that is often involved. In sum, due to cost and other issues, only well-financed organizations can afford to participate and profit from the world's IP systems.

Additionally, companies and individuals do not procure IP rights in the abstract. Rather, IP rights are procured with a business objective in mind (i.e., with a cost-benefit analysis). However, once procured, many IP properties lie unused due to the expense of identifying infringing products and/or licensing negotiations. By mining these idled corporate assets, significant revenues can be generated. However, such activities typically require a team of in-house lawyers, an overhead that most companies cannot afford.

Individual inventors are typically more aware of the value of their patents. They can use the services of invention promotion firms to extract values from their IP assets. However, the Federal Trade Commission (FTC) has investigated these firms for unscrupulous activities. As stated by the FTC in its Web site, "[i]ndeed, many inventors pay thousands of dollars to firms that promise to evaluate, develop, patent, and market inventions . . . and then do little or nothing for their fees."

The Internet has provided companies and individuals with access to information, including IP related information. However, as the information piles up, the sheer volume of data makes it difficult to locate and navigate the information needed to procure and trade IP assets. Hence, system is needed to cost-effectively facilitate and enhance the procurement and trading of IP assets.

SUMMARY

Systems and methods are disclosed to analyze a patent document by receiving patent application text including background, description of drawings, description and claims; generating a claim chart showing claim dependencies; checking for antecedent, support in drawings, support in the description; generating a navigable claim hierarchy; and generating a diagnostic message for the patent document.

Advantages of the techniques may include one or more of the following. The techniques provide an easy-to-use software product for applicants to learn and use. The software provides visually based tools to create an intuitive environment in which a patent application may be developed. The tools are simple to use yet sophisticated in their functionality. Inventors and patent agents/attorneys need not learn and use complicated programming techniques to achieve professional results. Rather, a writer needs to learn only a few basic skills and techniques about the art of patenting before the writer can create complex patent applications. Training time is reduced while the quality of work products is enhanced.

The techniques also support electronic patent filing that substitutes an electronic form of a patent application (or any other document related to the prosecution of the patent application) for a paper copy. The electronic form may be a floppy disk or a transmission through on-line communication. The techniques eliminate the cost and delay of physically handling, processing and delivering patent applications. The techniques also interact with the national patent offices in preparing their transmittal information and provide real time acknowledgment of submissions. The techniques also check the documents to be filed for errors and then prepare the documents for filing with the Patent Office.

The techniques also interface with different national electronic patent systems and allow the user to create an application that is compatible with the different national patent systems. The information is interchanged between the software and the various national patent systems using electronic techniques, which reduces most of the application processes conventionally conducted by a user, makes the patenting process efficient, enhances the reliability of the patenting process, and simplifies the control of operation by users.

The above techniques can be supported on an intranet or Internet portal that provides a single window to a user's most commonly used desktop information, as opposed to a handy collection of Web site links. The portal helps the user protect new ideas or concepts in an economical, efficient and fast manner by providing the user with access to a network of IP lawyers for assistance in finalizing the applications. The portal also links the user with IP related businesses such as those who specialize in trading or mediating IP related issues. The portal also provides access to non-IP resources, including venture capitalists and analysts who track evolving competition and market places. The portal remains with users the entire time they are online and can automatically update the users on any competing products or any new patents or trademarks granted in their areas of interest. Once users are logged-in, the portal remains in full view throughout the session, including when they are waiting for pages to download, navigating the Internet and even engaging in non-browsing activities such as sending or receiving e-mail.

The constant visibility of the portal allows advertisements to be displayed for a predetermined period of time. Thus, the techniques provide Internet advertisers and direct marketers a number of advantages in realizing the full potential of online advertising. The techniques capture the users' profiles regarding their areas of interests, current occupations, company affiliations, demographic information (such as age, gender, income, geographic location and personal interests), and the users' behavior when they are online with the system. As a result, the system can deliver targeted advertisements based on information provided by users, actual Web sites visited, Web-site being viewed, or a combination of this information, and measure their effectiveness. Thus, the system allows online advertisers to successfully target their audiences, largely due to the availability of a precise demographic and navigation data on users. The system also allows advertisers to receive real-time feedback and capitalize on other potential advantages of online advertising. The techniques provide an easy and efficient method for generating traffic to Web sites, strengthening customer relationships, which ultimately increases revenues on unused IP assets.

The techniques also support purchasing or selling intellectual property related products and services with a computerized bid, auction and sale system over a network such as the Internet. The techniques provide IP owners with access to an open market for trading IP. The techniques support a service-based auction network of branded, online auctions to individuals, businesses, or business units. The techniques offer a quick-to-market, flexible business model that can be customized to fit the IP needs of any industry and target technology.

On-line trading is done through a network-based community in which buyers and sellers are brought together in an efficient format to buy and sell intellectual property and other assets. The system permits sellers to list assets for sale, buyers to bid on assets of interest and all users to browse through listed items in a fully-automated, topically-arranged, intuitive and easy-to-use online service that is available 24-hours-a- day, seven-days-a-week. The system overcomes the inefficiencies associated with traditional person-to-person trading by facilitating buyers and sellers meeting, listing items for sale, exchanging information, interacting with each other and, ultimately, consummating transactions. Through such a trading place, buyers can access a significantly broader selection of assets to purchase and sellers have the opportunity to sell their assets efficiently to a broader base of buyers. The techniques support real time and interactive auctions that allows bidders place bids in real time and compete with other bidders around the world using the Internet. The techniques allow customer bids to be automatically increased as necessary up to the maximum amount specified, so bids can be raised and auctions won even when bidders are away from their computers.

Other advantages and features will become apparent from the following description, including the drawings and claims.

DESCRIPTION

Figure 1:
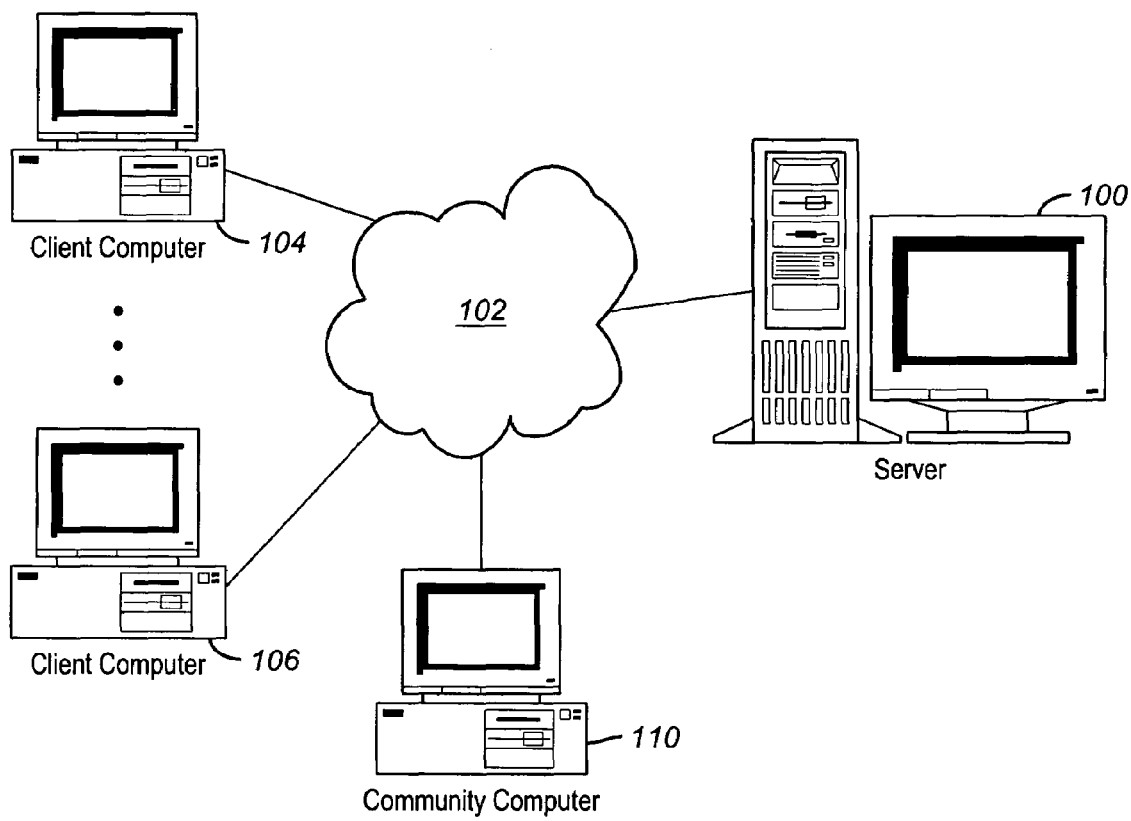
FIG. 1 is a diagram of an environment for processing intellectual property assets.

FIG. 1 shows an environment for processing intellectual property assets. A server 100 is connected to a network 102 such as the Internet. One or more client workstations 104-106 are also connected to the network 102. Additionally, an Internet community 110 with one or more service providers, manufacturers, or marketers are connected to the network 102 and can communicate directly with users of the client workstations 104-106 or indirectly through the server 100. The Internet community 110 provides the client workstations 104-106 with access to a network of IP specialists. For example, members of the Internet community 110 can include attorneys who can add value to the preparation, the prosecution, and the enforcement of the resulting IP rights. Additionally, the Internet community 110 also provides access to a variety of supporting members such as prior art search firms and patent delivery firms, among others. Additionally, one or more patent granting authorities 112 such as the US PTO, the Japanese Patent Office, and the European Patent Office, among others, can be connected to the network 102. The patent granting authorities 112 can receive electronic patent application submissions and can also provide various resources aiding patent applicants.

Although the server 100 can be an individual server, the server 100 can also be a cluster of redundant servers. Such a cluster can provide automatic data failover, protecting against both hardware and software faults. In this environment, a plurality of servers provides resources independent of each other until one of the servers fails. Each server can continuously monitor other servers. When one of the servers is unable to respond, the failover process begins. The surviving server acquires the shared drives and volumes of the failed server and mounts the volumes contained on the shared drives. Applications that use the shared drives can also be started on the surviving server after the failover. As soon as the failed server is booted up and the communication between servers indicates that the server is ready to own its shared drives, the servers automatically start the recovery process. Additionally, a server farm can be used. Network requests and server load conditions can be tracked in real time by the server farm controller, and the request can be distributed across the farm of servers to optimize responsiveness and system capacity. When necessary, the farm can automatically and transparently place additional server capacity in service as traffic load increases.

The server 100 can also be protected by a firewall. When the firewall receives a network packet from the network 102, it determines whether the transmission is authorized. If so, the firewall examines the header within the packet to determine what encryption algorithm was used to encrypt the packet. Using this algorithm and a secret key, the firewall decrypts the data and addresses of the source and destination firewalls and sends the data to the server 100. If both the source and destination are firewalls, the only addresses visible (i.e., unencrypted) on the network are those of the firewall. The addresses of computers on the internal networks, and, hence, the internal network topology, are hidden. This is called "virtual private networking" (VPN).

The server 100 supports an intellectual property portal that provides a single point of integration, access, and navigation through the multiple enterprise systems and information sources facing knowledge workers operating the client workstations 104-106. The portal supports services that are transaction driven. Once such service is advertising: each time the user accesses the portal, the client workstation 104 or 106 downloads information from the server 100. The information can contain commercial messages/links or can contain downloadable software. Based on data collected on users, advertisers may selectively broadcast messages to users. Messages can be sent through banner advertisements, which are images displayed in a window of the portal. A user can click on the image and be routed to an advertiser's Web-site. Advertisers pay for the number of advertisements displayed, the number of times users click on advertisements, or based on other criteria. Alternatively, the portal supports sponsorship programs, which involve providing an advertiser the right to be displayed on the face of the port or on a drop down menu for a specified period of time, usually one year or less. The portal also supports performance-based arrangements whose payments are dependent on the success of an advertising campaign, which may be measured by the number of times users visit a Web-site, purchase products or register for services. The portal can refer users to advertisers' Web-sites when they log on to the portal.

Yet another service supported by the portal is on-line trading of IP assets. By communicating through a wide area network such as the Internet, the portal supports a network-based community in which buyers and sellers are brought together in an efficient format to buy and sell intellectual property and other assets. The portal permits sellers to list assets for sale, buyers to bid on assets of interest and all users to browse through listed items in a fully-automated, topically-arranged, intuitive and easy-to-use online service that is available 24-hours-a-day, seven-days-a-week. Through such an IP trading portal, IP buyers can access a significantly broader selection of IP assets to purchase and sellers have the opportunity to sell their IP assets efficiently to a broader base of buyers. The portal overcomes the inefficiencies associated with traditional person-to-person trading by facilitating buyers and sellers meeting, listing items for sale, exchanging information, interacting with each other and, ultimately, consummating transactions.

Additionally, the portal offers forums providing focused articles, valuable insights, questions and answers, and value-added information about seed and venture financing and startup related issues, including accounting and consulting, commercial banking, insurance, law, and venture capital. The portal can connect savvy Internet investors with IP owners. By having access to the member's IP interests, the portal can provide pre-screened, high-quality investment opportunities that match the investor's identified interests. The portal thus finds and adds value to good deals, allows investors to invest from seed financing right through to the IPO, and facilitates the hand off to top tier underwriters for IPO. Additionally, members of the portal have access to a broad community of investors focused on the cutting edge of high technology, enabling them to work together as they identify and qualify investment opportunities for IP or other corporate assets.

Other services can be supported as well. For example, a user can rent space on the server to enable him/her to download application software (applets) and/or data—anytime and anywhere. By off-loading the storage on the server, the user minimizes the memory required on the client workstation 104-106, thus enabling complex operations to run on minimal computers such as handheld computers and yet still ensures that he/she can access the application and related information anywhere anytime. Another service is On-line Software Distribution/Rental Service. The portal can distribute its software and other software companies from its server. Additionally, the portal can rent the software so that the user pays only for the actual usage of the software. After each use, the application is erased and will be reloaded when next needed, after paying another transaction usage fee.

Figure 2A:
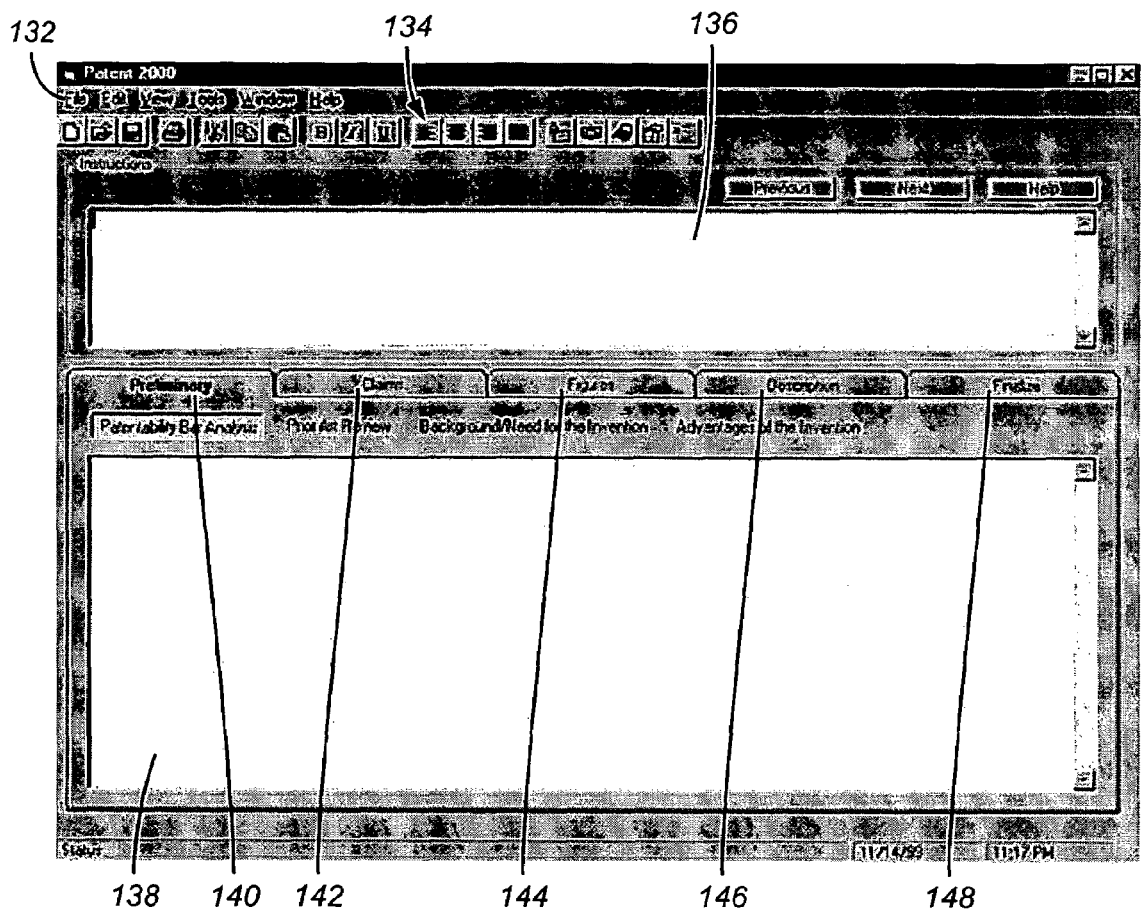
FIG. 2 is a flowchart illustrating a process for generating a patent application.
Figure 2B:
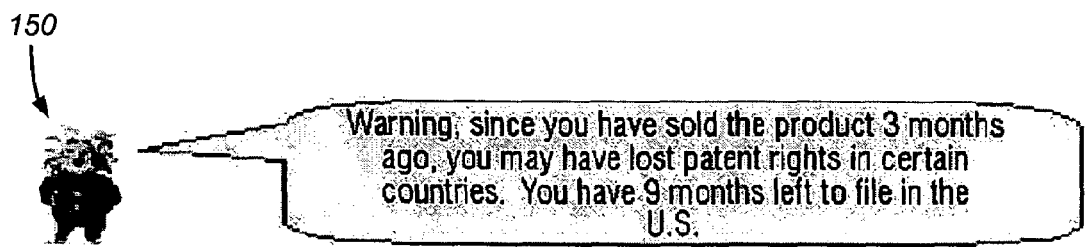
Figure 2C:
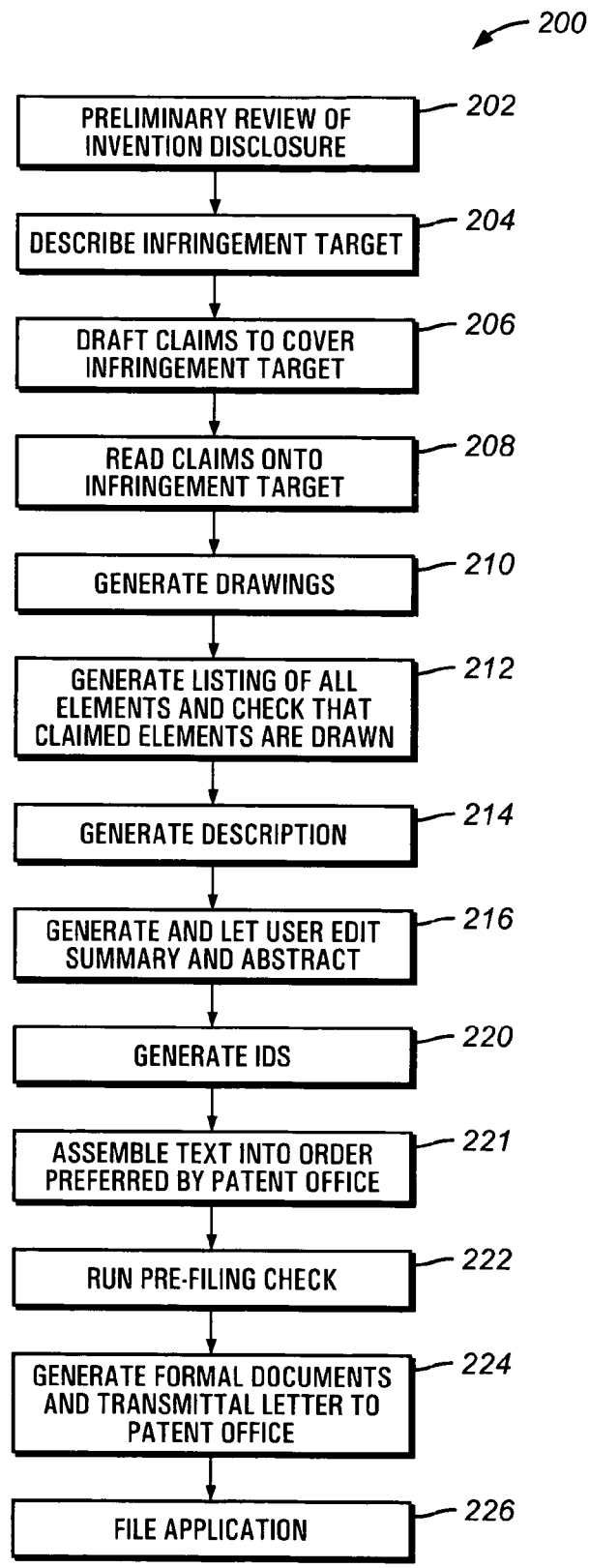

Software that can be downloaded from the server 100 includes a module to assist a user in generating a patent application. FIG. 2 shows a process 200 performed by the software for assisting the user in generating the patent application. First, the process 200 prompts the user to enter an invention disclosure and assist the user in discerning validity and patentability of subject matter (step 202). The prompting can be done using a help window or an electronic assistant (agent). The invention disclosure captures information relating to the need for the invention and existing solutions addressing this need. As part of the disclosure, the user is prompted to list any publications or planned disclosures (including abstracts and presentations) of the invention; describe and list the date of any sale or public use of the invention; and list the names, addresses and affiliation of anyone to whom the invention had been disclosed and whether such disclosure was written or oral. The information is used to determine whether the invention has been described in a printed publication anywhere in the world, or if it has been in public use or on sale before the date of the invention. The user is also prompted to search and electronically capture the closest prior art located from the search, or if an electronic version is not available, to manually describe the closest prior art. The closest prior art will be used later in ascertaining patentability and in refining the scope of the claims.

The process 200 then asks the user to describe a hypothetical product that, if produced, would infringe the claims (step 204). The process 200 then helps the user in drafting one or more patentable independent claims to cover the hypothetical product in view of the prior art (step 206). The process 200 also performs a potential infringement analysis by reading the claims onto the hypothetical accused product (step 208). If the infringement analysis indicates that the claims had been drafted too narrowly, steps 206-208 are repeated until the user is satisfied with the scope of the claims in view of the prior art.

The process 200 then guides the user in generating drawings associated with the invention (step 210). In this step, the process 200 provides a "brief description of the drawings" table with an intelligent entry bar so that the user can simply click on a brief description for a particular figure and the text becomes available for editing. The text is a listing of all figures by number and with corresponding statements explaining what each figure depicts. After drawings have been drafted manually or using a computer, the process 200 generates a listing of elements all elements used in the drawings. Based on the listing, the process 200 checks that the elements recited in the claims appear in the drawings (step 212) and otherwise the process 200 indicates an error. Also, if an element number is associated with two different element names, the process 200 indicates an error to the user. If the drawings are electronic, the process 200 can also check for conformance to drawing requirements by various Patent Office regulations such as paper margin requirements, among others.

The process 200 then assists the user in drafting the application itself, including text discussing the field of the invention and a background discussion of the invention (including citation and discussion of prior art). The information provided in the invention disclosure can be used as a basis for the background discussion. The brief description of the drawings generated in step 210 is copied to the appropriate location in the application. Next, the agent guides the user in generating a description, which is a detailed discussion of the invention (step 214). A summary of the invention and an abstract are automatically generated based on the claims, and the user can edit the computer-generated summary of the invention and abstract if needed (step 216). The summary is separate and distinct from the abstract and is directed toward the invention rather than the disclosure as a whole. The summary may point out the advantages of the invention or how it solves problems previously existent in the art (and preferably indicated in the Background of the Invention). The process 200 also generates an information disclosure statement (IDS) based on the known prior art (step 220).

When the user completes the application, the process 200 frames the draft application in accordance with a predetermined order of arrangement (step 221). In one embodiment, the order of arrangement is: Title of the invention; Cross-reference to related applications; Statement regarding federally sponsored research or development; Reference to a "Microfiche appendix"; Background of the invention, including a Field of the invention and a Description of related art; Brief summary of the invention; Brief description of the several views of the drawing; Detailed description of the invention; Claims; Abstract of the Disclosure; Drawings; and Sequence Listing (if any).

The process 200 guides the user through a detailed pre-filing check that eliminates common filing mistakes (step 222). The pre-filing check verifies that the Express Mail Declaration includes correct Mailing Label Number and Express Mail Mailing Label stub or sticker is attached to the Declaration; Postcard includes Express Mail Mailing Label Number and lists all papers being sent and the pages of each; Check for filing fee attached or deposit account charged on transmittal letter; Transmittal letter is complete and accurate, names ALL inventors IF KNOWN and includes Express Mail stamp; Cover sheet includes title, names of ALL inventors IF KNOWN, and Express Mail stamp; All pages are present and checked for printer errors, and all pasted in tables and handwritten symbols are included; At least one claim is included; Appendices, if any, include all pages and cover sheets of each include an Express Mail stamp; Microfiche appendix, if any, is referenced at start of specification; Declaration is signed and if not signed, warn the user that surcharge will be assessed and signed Declaration will be required within 3 months; All figures are included and checked against the list of figures in the specification; Figure stamp appears on back of all sheets; Assignment, if filed, is complete and includes Recordation Cover Sheet; Check for assignment fee is attached; Small Entity Declaration, if qualify, is signed by proper company officer or inventor; Foreign priority documents are enclosed to perfect the claim for priority; IDS, if included, lists all art cited by the applicant or examiner in any related application and any new art; Copies of all the art are included; and Transmittal letter includes Express Mail stamps with correct mailing label number, among others.

Additionally, the process 200 prepares a Declaration of Inventorship; prepares a small entity statement, where applicable; and generates a post card receipt to acknowledge all documents filed with the United States Patent and Trademark Office in Washington, D.C. Additionally, the process 200 generates a transmittal letter to the Commissioner of Patents (step 224).

At this point, the patent application can be file with a national patent office (step 226). The application can be hand-delivered, or can be delivered using a postal service. Alternatively, the patent application can also be saved onto a computer readable medium such as a disk that can then be forwarded to the Patent Office or the document can be transmitted directly using an on-line communication to the Patent Office.

In one implementation, the process 200 supports the US Patent and Trademark Office's Electronic Filing System (EFS) to allow the submission of patent applications electronically using the Internet. The USPTO has established as crucial to its Strategic Business Plan, the eventual goal of complete electronic filing of patent application submissions and the creation of an electronic workplace. The Electronic Filing System is one of several electronic commerce automated services to be provided to patent business customers. This capability is expected to be fully operation, according to U.S. Commerce Secretary William M. Daley: "The Department of Commerce is using the web to entirely change the way we interact with our customers. What eBay has done for auctions, we are trying to do for government. The EFS Pilot moves Commerce another step closer to going from a paper-based bureaucracy to an all-digital Department by the year 2002."

In this implementation, the system communicates with an electronic Packaging and Validation Engine (ePAVE,) developed by the US PTO to provide its customers with a means to enter transmittal and fee information, bundle it with the application's Declaration and Specification, compress the package, and transmit it to the agency. To address the confidentially and integrity of the information as it is being transmitted over the Internet, the system conforms to the US PTO's recently deployed Public Key Infrastructure (PKI) software to digitally sign and encrypt the information. Although the US PTO is mentioned as an example, other suitable patent offices include regional patent offices such as the European Patent Office and national patent offices such as the Japanese Patent Office, the Korean Patent Office, and the Vietnamese Patent Office, among others.

Figure 3A:
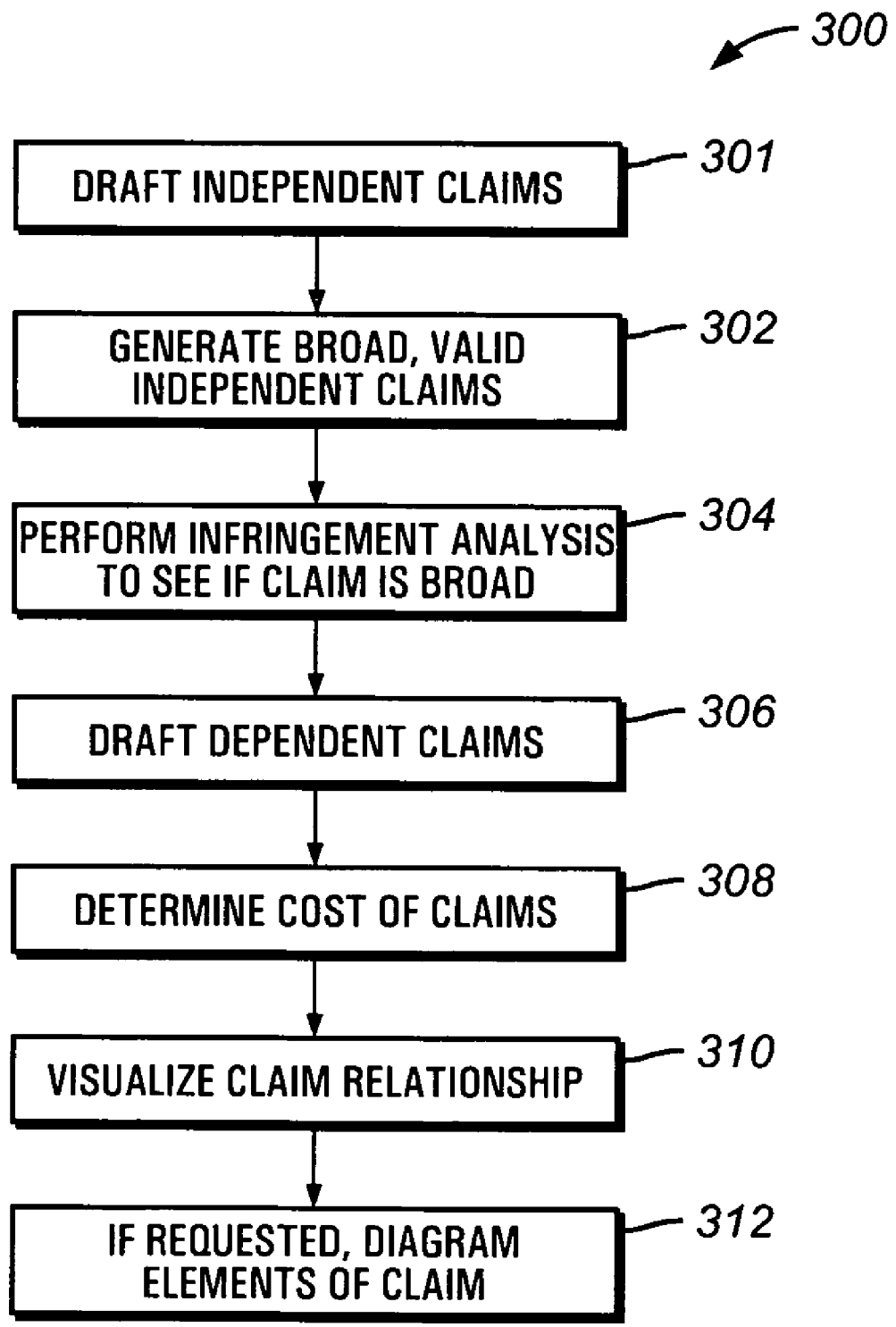
FIG. 3A is a flowchart illustrating a process for generating claims.

FIG. 3A shows in more details a process 300 that is an embodiment of step 208. First, the user is guided to draft one or more independent claims (step 301). In one embodiment, the claims are entered into a spreadsheet with two columns. The first column stores each element, while the second allows the user to enter notes about closest known prior art element. The instruction or agent then requests the user to enter each element and corresponding element in the prior art. If the corresponding element does not exists, the user can set the corresponding prior art element to "NO CORRESPONDING PRIOR ART ELEMENT." If the user does not know how to draft a claim, he can click a button "Show Example" and the independent claims associated with the prior art, if available, will be shown in sequence as an example.

Once an independent claim has been drafted, the agent guides the user through a series of sequence to broaden the independent claim while preserving validity over known prior art (step 302). First, the agent checks whether more than one "NO CORRESPONDING PRIOR ART ELEMENT" exists. If so, the claim is too narrow and the user is instructed to keep one of the "NO CORRESPONDING PRIOR ART ELEMENT" element. The remaining "NO CORRESPONDING PRIOR ART ELEMENT" elements can be moved into dependent claims. Alternatively, if every element of the invention is met by the closest prior art, the agent tells the user that a new element or distinguishing point needs to be added to be patentable over the prior art.

Once the independent claim is deemed to be patentable over the prior art, the process 200 performs an infringement analysis that focuses on the breadth of each independent claim (step 304). The spreadsheet showing elements of the claim becomes a checklist for determining whether infringement exists. If all the elements in the infringement checklist are present (either literally or equivalently), then infringement exists for the hypothetical product. If even one checklist element is missing, there is no infringement of that claim. The agent probes for a generic alternative for each element and uses the generic alternative in place of the specific version of the element in an independent claim, with the specific version being used in appropriate dependent claims for purposes of claim differentiation. For example, if the claim recites a "jet engine" but the invention can work with any type of engine, the agent would suggest moving the specific reference "jet" to a dependent claim.

The agent iteratively asks the user what elements can be eliminated from a claim. For each element, the agent asks the user whether this element is really necessary and can a competitor do without the element in a design around effort. Pseudo code executed by the agent for reducing the risks of a design-around is as follows:

With each independent claim, select the one or more elements that can be omitted from a commercial product.
Select one element of least importance and substitute an element that performs the same function but is physically as different as possible from that of the claimed element so as not to be considered an insubstantial change.
Select the least important element and determine if the element can be changed so as to force it to function in a different way (from what is recited in either the specification or claim) while producing the same result.
Iterate until the above steps can not be done.

Based on the independent claims, the process 200 guides the user through generating the dependent claims (step 306).

This is done by iteratively asking the user about significant variations on each element of the independent claims. Pseudo code executed by the agent for generating the dependent claims is as follows:

For each independent claim:
Identify major elements for the claim; and
For each element, generate dependent claims covering:
    Potential substitutes; or
    Actual elements required to implement the invention
Next As each new claim is generated, the process 200 shows a running cost associated with number of claims so far to help the user perform a cost/benefit analysis of claims (step 308).

Figure 3B:
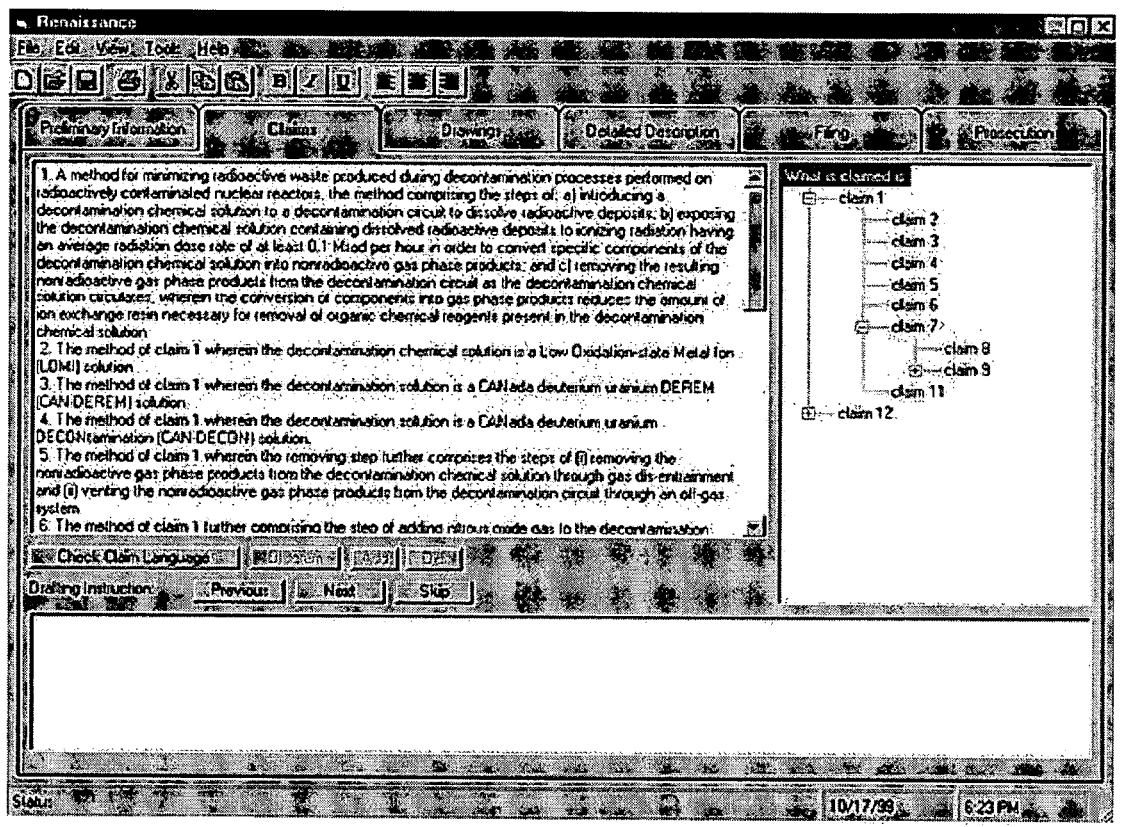
FIG. 3B shows an exemplary graphical user interface for a claim tree.

When requested by the user, the process 200 can show a claim tree to help user visualize inter-claim relationship (step 310). An exemplary graphical user interface for the claim tree is shown in FIG. 3B. To move claims, the user can drag/drop claims and the claims will automatically be renumbered to show their new relationship. The user can also select a claim and add new claims or delete an existing claim. All other claims will be automatically be adjusted and renumbered accordingly.

Figure 3C:
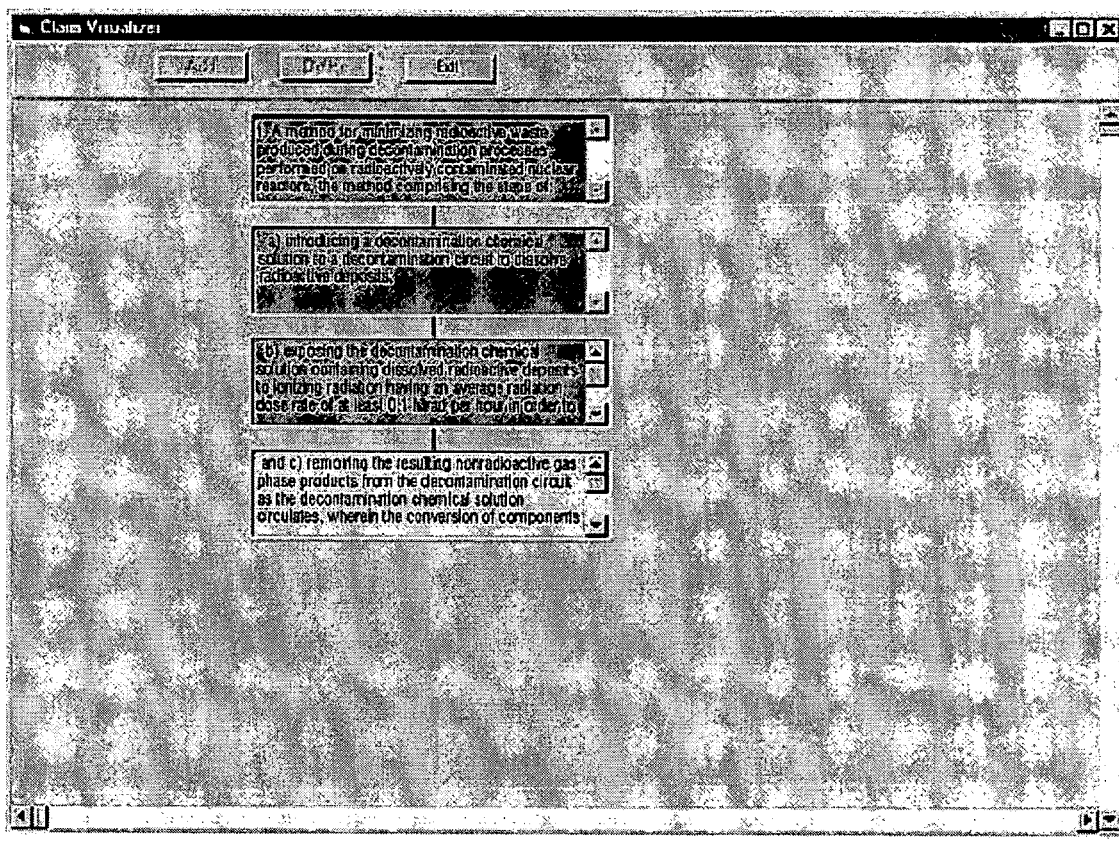
FIG. 3C shows an exemplary graphical representation of an exemplary claim.

Also, once the user clicks on a particular claim, he can request the computer to diagram elements of the claim in a graphical representation (step 312). Pseudo-code for creating a graphical representation of a claim is:

Create and initialize empty tree data structure.
For each element:
    Add new node to tree.
    If the element is written in functional language
        Select previous node as the parent node.
    Else
        If the element refers to another claim element with words such as "coupled to" or "connected to", select the node being referred to as the parent node.
    Make current node a descendant of the parent node.
    Draw element and connect the element to the parent node.
Next FIG. 3C shows an exemplary graphical representation of an exemplary claim. The user can select a claim element and add new elements or delete an existing element. All other elements will then be automatically adjusted accordingly.

Figure 3D:
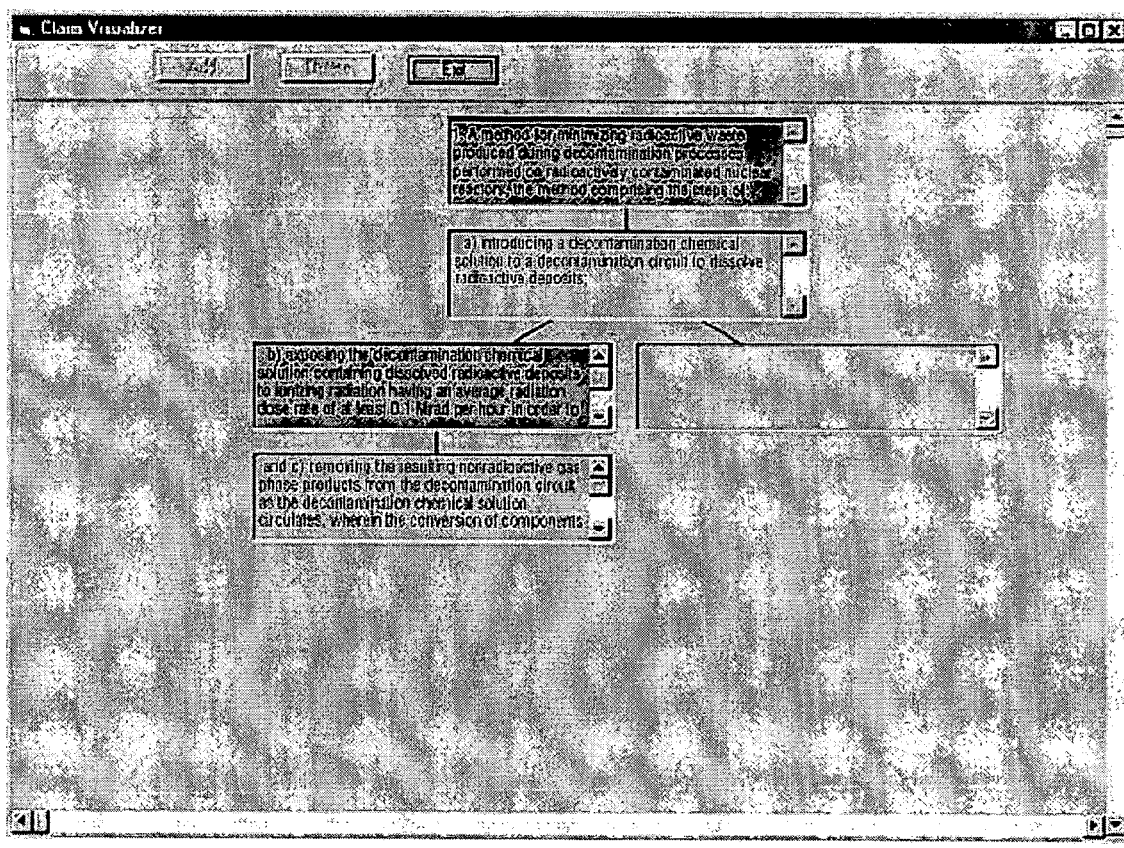
FIG. 3D is a flowchart illustrating a process for performing antecedent basis checking on the claims.

FIG. 3D is a flowchart illustrating a process 340 for performing antecedent basis checking on the claims. The US PTO and many other Patent Offices require the claims to be written in clear and concise language. One rule is that the first time an element appears, that element is preceded by "a" or "an" and the next time the element is mentioned in the same or dependent claim, the element should be preceded by "said" or "the". The process 340 checks that, whenever the user uses "the" or "said" before an element, that element was properly introduced with "a" or "an" in front of the element.

For each claim, the process 340 initializes a pointer to the current text position (step 342). Next, if the claim preamble indicates that the claim is a method or a process claim, the process 340 identifies all gerunds except comprising/including/having as antecedent basis candidates (step 344) and save the gerund phrase in an element table for the claim (step 346).

Alternatively, if the claim is not a method or process claim, the process 340 repeats the following until the end of claim. First, the process 340 identifies the next occurrence of "the" or "said" and identify potential end of noun phrase (step 348). One way to determine the end of the noun phrase is to look for keywords such as for, to, etc. within a predetermined number of words from the "the" or "said". If no keyword exists, the process 340 can do a sliding search for subsequent occurrences of a noun phrase matching the phrases following "the" or "said." Additionally, since a subsequent reference to a multi-word element may not precisely repeat the entire text for the element, the process 340 can extract word clusters from the text for the element. Such clustering discovers word groups that can be used to determine an inexact antecedent basis match. These word groups are also useful in finding occurrences of the element in the detailed description. Further, fuzzy word search techniques can be used to perform an inexact comparison of a multi-word element.

Further, if the noun phrase is in a gerund+means form (for example, adding means), the process 340 adds an entry to cover the "means for"+gerund form (for example, means for adding) (step 350). The noun phrase is saved in an element table for the claim (step 352).

Figure 3E:
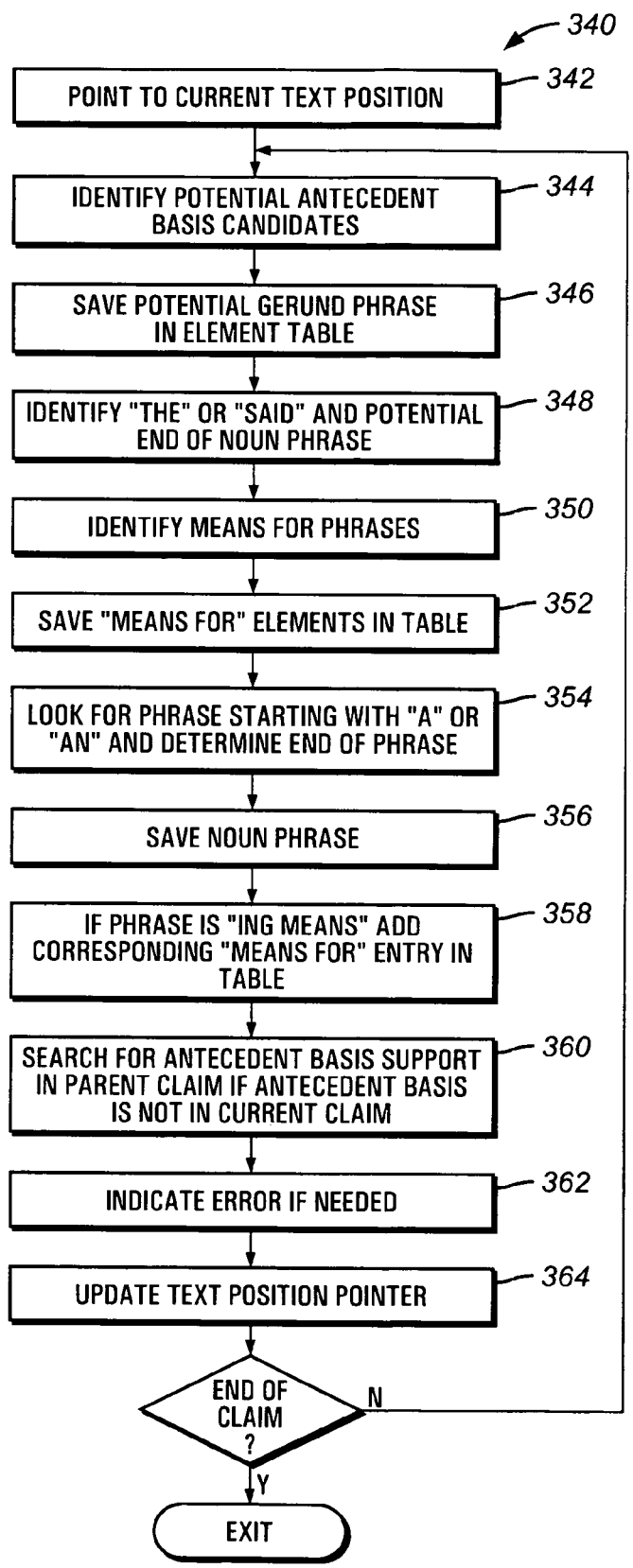
FIG. 3E is a flowchart illustrating a process for performing connectivity checking on the elements of the claims.
Figure 3F:
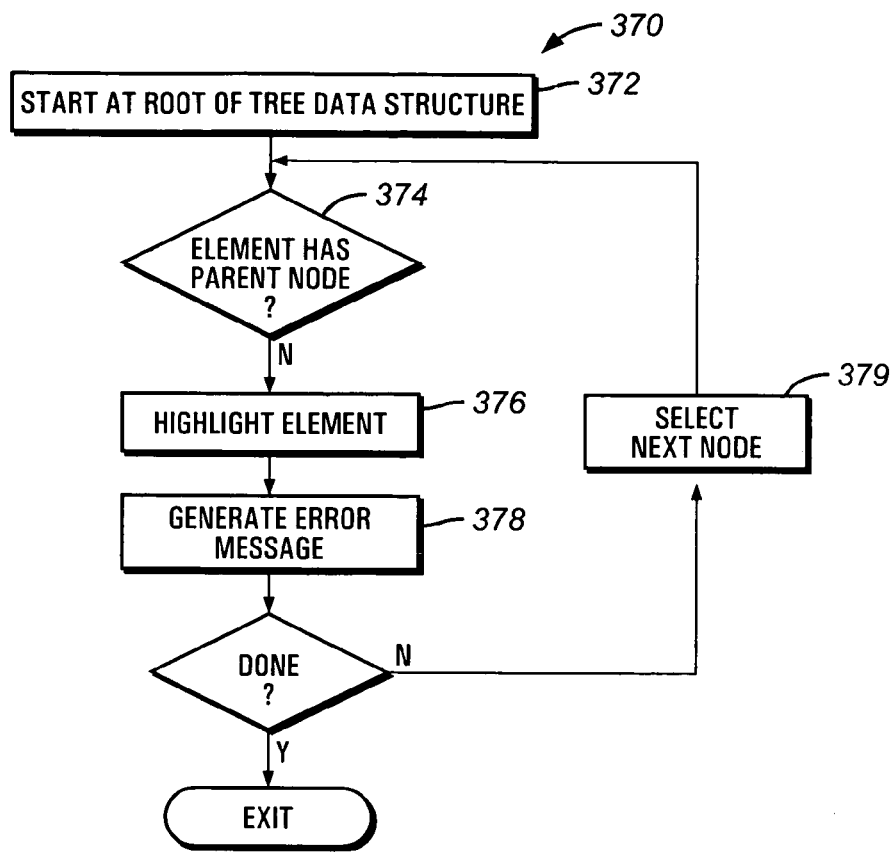
Figure 4:
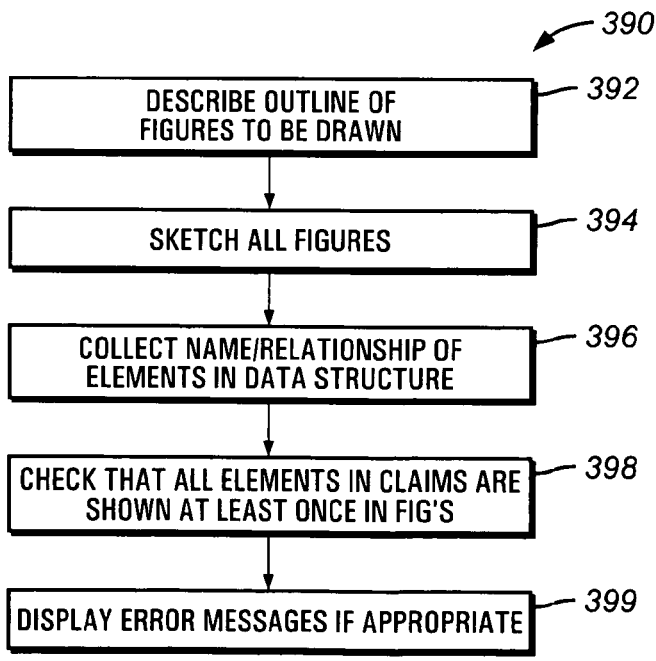
FIG. 4 is a flowchart illustrating a process for generating figures for an application.

The process 340 also looks for a matching occurrence of "a" or "an" indicating a start of noun phrase. As done above, the process 340 also identifies a potential end of noun phrase (step 354). The noun phrase is then saved in the element table for the claim (step 356). Again, if the noun phrase is gerund+means form, the process 340 adds an entry to cover the "means for"+gerund form (step 358). If no matching occurs for the text in the current claim and if claim is a dependent claim, the process 340 searches parent claims for antecedent basis support (step 360). This is done by searching the element table for each claim. If all claims have been searched and no match exists, the process 340 highlights the element with "the" or "said" to indicate a problem and generates an antecedent basis error message (step 362). The process 340 then updates the pointer to the current position in the claim text and loops back to step 344 to check the next element (step 364). Pseudo-code for performing antecedent basis checking for each claim is:

Initialize pointer to current text position in claim.
If claim is method or process claim:
    Identify all gerund phrases in claim except "comprising/including/having" as antecedent basis candidates.
    Save noun phrase in an element table for the claim.
Else repeat until end of claim
    Identify next occurrence of "the" or "said" and identify potential end of noun phrase. Save noun phrase in an element table for the claim. If noun phrase is gerund+means form, add an entry to cover the "means for"+gerund form.
    Look for matching occurrence of "a" or "an" indicating a start of noun phrase and identify potential end of noun phrase. Save noun phrase in an element table for the claim. If noun phrase is gerund+means form, add an entry to cover the "means for"+gerund form.
    If no matching occurrence for current claim text and if claim is a dependent claim, search parent claims for antecedent basis.
    If all claims have been searched and no match exists, highlight element with "the" or "said" and flag antecedent basis error.
    Update pointer to current position.
End if FIG. 3E is a flowchart illustrating a process 370 for performing connectivity checking on the elements of the claims. This is another rule required by the US PTO that all elements of a claim must be interconnected. This can be done by a structural connection, for example: "an [element 2] fixably attached to said [element 1] . . . " Alternatively, when functional claims such as means plus function claims are used, a functional connection can be implicit. The process 370 checks for dangling elements that are not connected to other elements unless the functions of the elements inherently connect the elements. The process uses the tree data structure previously created in accordance to the pseudo-code of step 312. First, the process 370 starts at root of tree data structure (step 372). Next, for each node of the tree data structure representing an element, the process checks whether the element has a parent node (stands alone) (step 374). If not, the process 370 highlights element in the graphical representation (step 376) and generates an error message (step 378). The next node is selected and analyzed until all nodes have been inspected for connectivity. Pseudo-code for performing connectivity checking is:

Start at root of tree data structure.
For each node representing an element:
    If the element does not have a parent node (stands alone),
        highlight element and generate error message.
Next FIG. 4 shows a process 390 for generating drawings. First, the process 390 asks the user to describe an outline of the figures to be drawn (step 392). The outline can be used to generate a first draft of the "Brief Description of the Drawings." Next, the user is prompted to sketch all figures (step 394). Each figure is composed of one or more elements, each of which has a name. The process 390 collects the name and the relationship of the elements into a data structure that will be used to check conformance to the claim language and to generate a first draft of the description in FIG. 5 (step 396). Next, the process 390 checks to ensure that all elements recited in the claims are shown in the figures (step 398). This is done by comparing the element table for each claim against the data structure saved in step 396. If one or more elements recited in the claims are not shown in the figures, the claim element is highlighted and an error message is shown (step 399) before the process 390 loops back to step 394 to allow the user to update the figures.

Figure 5:
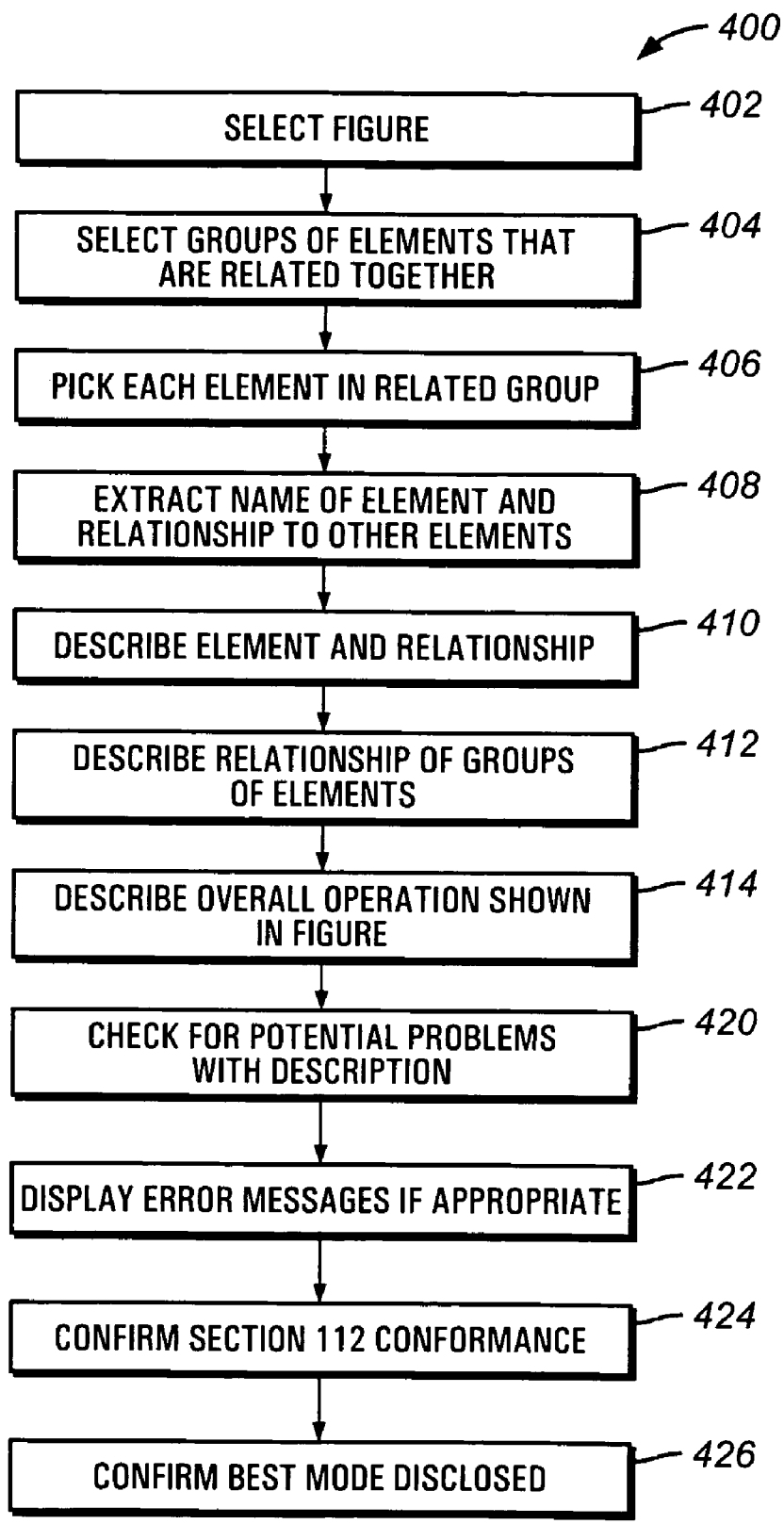
FIG. 5 is a flowchart illustrating a process for generating a description for the application.

FIG. 5 illustrates in more detail the generation of the description. The description is a textual description of the drawings. In this section, the invention must be explained along with the process of making and using the invention in full, clear, concise, and exact terms. This section should distinguish the invention from other inventions and from what is old; and describe completely the process, machine, manufacture, composition of matter, or improvement invented.

In general, the description simply discusses the invention in sufficient detail so that any person of ordinary skill in the art could make and use the invention without extensive experimentation. The best mode contemplated by the inventor of carrying out the invention must be set forth in the description. Each element in the drawings should be mentioned in the description. The user should also describe any possible equivalents for each element recited in the claims. The explicit equivalent discussion in the patent application can frustrate attempts to design-around the patent using equivalent elements.

In one embodiment, a process 400 generates a description by taking the elements of each figure, ascertaining the relationships among the elements, and textually describes the elements in the figures. The process 400 builds on the figures generated in FIG. 4. Hence, the process 400 needs not check for conformance of element names in the figures to the claims. However, if the process 400 is executed in a stand-alone mode, the figures need to be checked to ensure that all elements of the claims are shown in the figures first.

The process 400 first selects a figure to describe (step 402). The process 400 then determines various related groups of elements to focus on one at a time (step 404). For each related group of elements in the figure, the process identifies each element in the related group (step 406) and extract name of element and relationship to other element(s) in the figure (step 408). This information is translated into text form. Reference characters corresponding to elements recited in the detailed description and the drawings are used in conjunction with the recitation of the same element or group of elements in the claims. The reference characters are enclosed within parentheses so as to avoid confusion with other numbers or characters that may appear in the claims. The process 400 also textually describes the operation of element and relationship of element to other element(s) (step 410). The process 400 then textually describes the operation of the group of elements in combination so that a reader can have a bird's eye view of the element's role (step 412). Further, the process 400 also prompts the user to provide an overview description of all elements in the figure at the end of the description for the figure to package the description in clear and easy to read language (step 414).

The process 400 also checks for informalities such as conformance to paper size, margin spacing, line spacing, and page numbering, among others. Additionally, the process 400 checks to ensure that all elements recited in the claims are described in the description section (step 420). This is done by searching each entry in the element table for each claim against the description generated. If one or more elements recited in the claims are not shown in the description, the claim element is highlighted and an error message is shown (step 422) before the process 400 allows the user to update the figures.

The process 400 also prompts the user to confirm that the specification includes adequate written description of the invention or discovery and of the manner and process of making and using the same, and is required to be in such full, clear, concise, and exact terms as to enable any person skilled in the art or science to which the invention or discovery appertains, or with which it is most nearly connected, to make and use the same (step 424). This is necessary since the specification must set forth the precise invention for which a patent is solicited, in such manner as to distinguish it from other inventions and from what is old. It must describe completely a specific embodiment of the process, machine, manufacture, composition of matter or improvement invented, and must explain the mode of operation or principle whenever applicable.

The process 400 also prompts the user to ensure that the best mode contemplated by the inventor of carrying out his invention has been described (step 426). In the case of an improvement, the process 400 prompts the user that the specification must particularly point out the part or parts of the process, machine, manufacture, or composition of matter to which the improvement relates, and the description should be confined to the specific improvement and to such parts as necessarily cooperate with it or as may be necessary to a complete understanding or description of it. Pseudo code for generating the description is:

For all Figures
Select next Figure
For each related group of elements in the Figure
    For each element in the related group
        Extract name of element and relationship to other
            element(s) in the Figure.
        Textually describe the operation of element and relationship of element to other element(s).
    Next
    Textually describe the operation of the group of elements in combination.
Next
Textually describe the operation of the figure as a whole.

Next

Check for conformance to claim language and Section 112 requirements.

Figure 6:
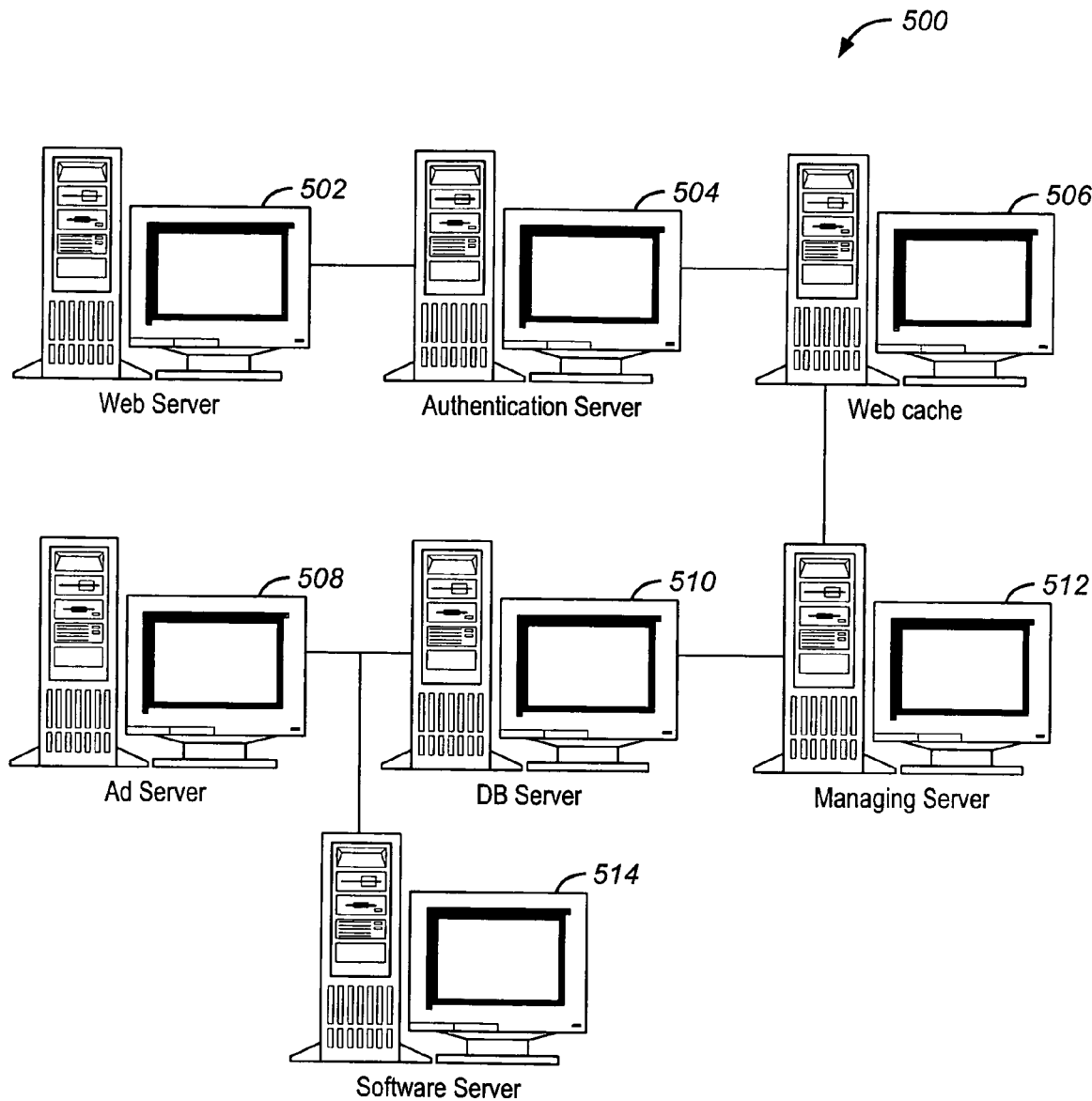
FIG. 6 is diagram of an intellectual property portal.

FIG. 6 shows a diagram of a system 500 to support a portal. The system 500 includes a web server 502 that hosts Java, HTML and CGI scripts relating to the portal. An authentication server 504 authenticates user logins. A web cache 506 holds links to the intellectual property community 112 such as patent lawyers and businesses dealing with patents. An advertising server 508 serves advertisements and latest IP as well as technology news.

A database server 510 stores user profiles and transaction/auction information. When a new account is being created, the portal can capture useful demographic data such as technology interests. A better understanding of the users can lead to more targeted audiences, so the portal collects as much customer data as possible. Once subscriber data is collected and verified, the portal creates a user account and activates services. The user can begin using services immediately. Additionally, a data management server performs data backup and restoration of user folders residing on the portal.

A messaging server 512 hosts e-mail, supports dedicated virtual private networks (VPNs) for users and corporations to form their own IP network. A software server 514 hosts the patent generation software and upgrades and other information related to the software. The software server 514 also hosts various software downloadable by the user to access the portal.

When a user enters the portal for the first time, the portal presents the user with a simple form to collect basic information about the user, such as names and email addresses. After the user completes the form, he will be shown a legal agreement that he can sign online by clicking a button "Accept." Alternatively, the user can request a copy of the statement to be downloaded or mailed to him by clicking "Mail Agreement". The Mail Agreement affords the user with an opportunity to review the details of the agreement with a lawyer if necessary.

After the user signs the agreement by clicking the "Accept" button, he or she will be given a username and password and a registration identification, all of which will be mailed to him at the e-mail address entered in the registration form. The user will also be emailed a welcome package with introductory information about Intellectual Property. After the user signs in for the first time, he will be guided to create a personal profile. The profile tracks the user's interests in various Intellectual Property News, Intellectual Property Laws, Seminars and Conferences, Network of Other People with similar interests, Intellectual Property Auctions & Exchanges, Intellectual Property Lawyers, Intellectual Property Businesses Intellectual Property Mediators between two companies contesting the same IP subject matter, Intellectual Property Forms (Non-disclosures etc), Patent/Trademark/Copyright Updates and Market Place updates. Though all the services are available to all on the portal, this will personalize his areas of interest and send updates to his desktop directly. The portal can create personalized pages for members by dynamically serving-up the content to each user utilizing dynamic HTML, among others.

Once the user completes the personal profile, he will be prompted to download a client software called an "intellectual property assistant" (assistant). The software runs constantly on the user's desktop and connects to the portal whenever the user connects to the Internet. The assistant process is hidden from the desktop process list so that the assistant process cannot be accidentally "killed" or removed by accident. The user can configure this assistant to suite his/her needs. The assistant will also allow the user to have a CHAT/Online Conference with other users registered with the portal.

After connecting to the portal, the assistant checks for the latest updates in his areas of Interest and show them in a small window at the bottom left portion of the screen. The client software performs multiple tasks, including establishing a connection to the portal; capturing demographic information; authenticating a user via a user ID and password; tracking Web-sites visited; managing the display of advertising banners; targeting advertising based on Web-sites visited and on keyword search; logging the number of times an ad was shown and the number of times an ad was clicked on; monitoring the quality of the online session including dial-up and network errors; providing a mechanism for customer feedback; short-cut buttons to content sites; an information ticker for stocks, sports and news; and a new message indicator. When the user accesses the portal, a background window is shown on his or her computer screen that is always visible while the user is online, regardless of where the user navigates. The window displays advertisements, advertiser-sponsored buttons, icons and drop-down menus. By clicking on items in the background window, users can navigate directly to sites and services such as intellectual property news, intellectual property laws, seminars and conferences, connections to others with similar interests, intellectual property auctions & exchanges, intellectual property lawyers, intellectual property businesses, intellectual property mediators between two companies contesting the same IP subject matter, intellectual property forms such as a non-disclosure agreement, patent/trademark/copyright updates and market place updates. Revenues can be generated by selling advertisements and sponsorships on the background window and by referring users to sponsors' Web-sites. The assistant shows advertisements while its window is visible. If the user clicks on an advertisement or news or related feature, the assistant will automatically launch the browser and take the user to the advertiser's site.

The portal incorporates data from multiple sources in multiple formats and organizes it into a single, easy-to-use menu. Information is provided to the public free-of-charge with value added databases and services such as patent drafting assistance available to subscribers who pay a subscription fee. At a first level, the public can use without charge certain information domains in the portal. At a second level, individual inventors, very small companies and academic users can access the patent drafting software when they subscribe to a first plan with a predetermined annual membership fee and a transaction fee charged per patent application. At a third level, companies can access additional resources such as an IP portfolio management system, a docket management system, a licensing management system, and a litigation management system, for example. In this manner, the portal flexibly and cost-effectively serves a variety of needs.

Other resources that the portal provides access to include intellectual property traders who mediate between potential licensors and licensees. These traders conduct accurate evaluations of patented technologies as property rights, as well evaluating their market value. An electronic valuation module estimates the value of the IP assets. Factors evaluated include term of duration of rights; status of applications made in foreign countries and rights approved there; litigation with third parties; licensing status; technical nature of invention (three categories: basic technology, vastly improved technology and marginally improved technology); related patents; technical dominance of the IP asset, as judged by degree to which invention has been developed into a superior concept, extent and clarity of specification; clarity of range of technology if there is something unclear in the range of technology for which rights have been formed or there is concern over the occurrence of infringement-related disputes; relationship to use of IP rights possessed by third party; technical superiority to substitute technology; extent to which invention has been proven in real use; necessity of additional development for commercialization; markets for commercialization; transfer and distribution potential; inventors (or right-holders)'s intent to engage in continual research and development and the possibility of applying the results; potential restrictions on the places that it can be licensed to (such as limits on the term and region of implementation); the right-holder's ability to exercise its rights against infringing parties; the possibility that rights will be invalidated, canceled, or limited; the business potential of the invention; the possibility that substitute technology for the invention will be developed; the potential for competing or substitute products will appear; the ease that imitation products be easily manufactured; the ease of detecting infringing products; the size of the market, the market scale, the market share that is acquirable and the time frame for acquiring the targeted market share; the life span for the product's market; the price that a customer is willing to pay for the value generated by the relevant patent right; and the sustainability of the profit.

The portal also provides access to a bid, auction and sale system wherein the computer system establishes a virtual showroom which displays the IPs offered for sale and certain other information, such as the offeror's minimum opening bid price and bid cycle data which enables the potential purchaser or customer to view the IP asset, view rating information regarding the IP asset and place a bid or a number of bids to purchase the IP asset.

The portal has access to IP search engines that continuously search the web and identify information that is of interest to its users. These search engines will use the user profiles to search the web and store the results in the user folders. This information is also relayed to the users using the assistant. The portal delivers focused IP contents to interested subscribers and indirectly drives these subscribers and their businesses to innovate.

The portal thus allows users to draft their own applications rapidly and accurately and in a manner that conforms to the requirements of the major national patent offices. Quality in the resulting patent application is achieved by providing an expert system in our software that guides members through each step of preparing an application. Speed is achieved by integrating the IP generation process with existing business workflow. When a communication from the patent office is received, the expert system guides the user through the process of responding. Since the member is generating the bulk of the work product, the cost in procuring the IP asset is reduce, while responsiveness is enhanced.

A network of independent patent attorneys can perform value-added pre-filing check to enhance the member's work product, if desired. Information relating to the network of attorneys will be maintained in a searchable database. Thus, members can search by the attorney's specific expertise (legal as well as technical) and by location. Members can then email the selected attorney a question. To prevent conflict issues, the members will be warned that the first question should be couched abstractly so that the invention is not revealed. Further, each attorney in the network automatically observes the applicable conflict rules in his or her jurisdiction before taking on the question. One or more attorneys in the network can respond to the first question to initiate the consultation process, if no conflict exists. The parties can then negotiate fees relating to subsequent questions and/or work. As such, the portal supports a market-based system for getting qualified IP assistance.

The portal generates revenues by providing advertisement space to law firms, attorneys, patent-support businesses and corporations. All business references for business-to-business transactions will be charged a fee depending on the service levels. Moreover, individuals or companies who use the IP trading services to acquire patents will pay membership fees and a percentage of the cost of the traded IP. They can also choose to pay a royalty instead of a one-time cost. By having access to the member's IP interests, the Web site can provide pre-screened, high-quality investment opportunities that match the investor's identified interests. The web site thus finds and adds value to potential deals, allows investors to invest from seed financing right through to the IPO, and facilitates the hand off to top tier underwriters for IPO. Additionally, members have access to a broad community of investors focused on the cutting edge of high technology, enabling them to work together as they identify and qualify investment opportunities for IP or other corporate assets.

Although the above systems and processes are geared toward patents, the system can process applications for copyrights and trademarks. In one embodiment for generating software copyright applications, the system selects and displays an appropriate form such as a Form TX from the Copyright Office. Databases are generally considered to be literary works, and are also registered using Form TX. If the database is continually updated, it may be considered a serial work, whose registration should be completed using Form SE. If pictorial images and accompanying sounds are dominant over the text therein, the application should be registered as an audiovisual work, using Form PA.

The system then walks the user through each section of the application. For Form TX, the system prompts the user to enter a title, which is the name of the work that the Copyright Office will use for indexing purposes, and for future identification. Here, each program will need its own title and, optionally, a version number. If the version number is other than 1.0, an examiner will inquire and allow only the additions over the earlier, but noncopyrighted, versions. If the software is known by any other titles in a previous version, then that information must be filled into the space for the block labeled Previous or Alternative Titles. Further, in cases where the work is a contribution to a periodical, serial or collection, the collective work must also be identified.

The system then guides the user in Section 2 of Form TX, where the author or authors are identified. If the work was made for hire, then the hiring party is the author. If not, the person who actually wrote the program is the author. If the work-for-hire box is checked, the employer should be identified as the author. The author's birth date is required, where an individual is the author, but is not required if the software is a work-for-hire. If the author is deceased, the year of death must be included. Finally, the nationality or domicile of the author is needed.

Further, a brief description of the work must be entered in the space labeled "Nature of Authorship." For computer programs, the user is prompted to broadly state the description. The following provides a list of examples: computer program, entire computer code, entire program, entire program code, entire text, entire work, module, program, program instructions, program listing, program text, revised program, routine, subroutine, software, and text of program. The system then prompts the user to fill Section 3, which asks for the creation date, or the date that the work was first fixed in some medium, and the publication date, or the date of first distribution (or offer of distribution), public performance, or public display. Similarly, Section 4 asks for the names and addresses of each claimant, which can be the author, or a person or organization who has ownership interests in the work. If the claimant is not the author, a brief statement explaining the chain of ownership should be given. This statement can be as simple as "By written contract," "Transfer of all rights by author," or "Assignment."The application need not include transfer documents or riders to support the statement. The user is guided on to Section 5, which asks for the date of the latest prior registration of the work and (assuming the identical work has already been registered) the basis for the subsequent application. If the same version has already been registered, a subsequent registration may be used to correct authorship, or where the work was originally registered in an unpublished version, a subsequent registration can be sought for the published version. Next, the system provides a menu for the user to determine if the work being registered is a changed version, a compilation, or a derivative work. In Section 6, the system presents the user with choices along with explanation on the choices, including "Previous Version," "Revised Computer Program," or "Revisions and Additional Text of Computer Programs." If the work is both a derivative work and a compilation, the system prompts the user to state "Compilation and Additional New Materials."

Further, the system prompts the user to provide a deposit material. For a computer program, the deposit material must be in some visually perceivable form. Where the program has not been published (or if the program has been published only in machine readable form) one complete copy of "identifying portions" of the program must be reproduced on paper or microfilm. If published, 2 copies of the program must be submitted. Generally, an identifying portion consists of the first and last 25 pages (or equivalent units of source code) if printed on paper, plus the page containing the copyright notice. Alternatively, if the program is less than 50 pages, the whole program listing can be deposited.

Similarly, for trademark applications, another embodiment can walk the user through whether he or she wishes to generate use-based applications or intent-to-use (ITU) applications, which are available if one has not yet used the mark on goods. The system prompts the user to list all the goods with which the mark will be used, or has been used. This should be carefully worded to ensure that the registration is not unduly narrowed. The system then requests a description of how the mark is used. A trademark must be used on (or in connection with) the actual goods—advertising is not sufficient use. The system can ask if the mark is a composite mark (such as a logo plus words), then the system presents the user with a choice of registering the word mark alone, the word/logo combination, or the logo alone. The system also guides the user with the selection of specimens with a use application. These are actual labels, tags, or packaging. The system can then suggest alternatives such as photographs that can be sent instead of specimens when the specimen is not flat, or when it is too large.

This invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A computer implemented method to analyze a patent document, comprising:
   generating a claim tree showing inter-claim relationship between descendant and parent claims;
   utilizing an interface so that when a user selects a claim a graphical representation of the inter-claim relationship is diagrammed;
   moving claims when requested by the user, the claim tree visualizes the inter-claim relationship, wherein moving the claim by using drag and drop selection the claims will automatically be renumbered to show their new inter-claim relationship;
   adjusting claims when selected, added, or deleted, wherein all other claims will be automatically be adjusted and renumbered; and
   checking the claims for antecedent and support in drawings and support in description; and
   indexing terms in the claims, along with automatically detecting and displaying a claim number from a claim text and claim status as independent claim type or dependent claim type; and
   identifying broader and narrower terms, and prompting a user whether a predetermined element is necessary or whether the predetermined element is not needed in a design around.

2. The method of claim 1, further comprising checking terms in the document and for each element, generating dependent claims covering potential substitutes or elements required for implementation.

3. The method of claim 1, further comprising automatically detecting and displaying a claim number from a claim text and claim status as independent claim type or dependent claim type.

4. The method of claim 1, further comprising checking an element of the claim presence in a prior art reference.

5. The method of claim 1, further comprising coupling the claims with one or more prior art references.

6. The method of claim 1, further comprising:
   a. extracting element name and relationship to other elements; and
   b. describing operation of one element and relationship to other elements.

7. The method of claim 1, further comprising checking for consistency of element numbers.

8. The method of claim 1, further comprising searching Internet search engines for terms and phrases.

9. The method of claim 1, further comprising prompting a user to refine a claim by:
   a. selecting one or more elements that can be omitted from a commercial product;
   b. substituting an element with another that performs the element's function but is physically different from the element; and
   c. determining if the element can be changed to function in a different way while producing the same result.

10. A computer implemented method to analyze a patent document, comprising:
    generating a claim tree showing inter-claim relationship between descendant and parent claims;
    utilizing an interface so that when a user selects a claim a graphical representation of the inter-claim relationship is diagrammed;
    moving claims when requested by the user, the claim tree visualizes the inter-claim relationship, wherein moving the claim by using drag and drop selection the claims will automatically be renumbered to show their new inter-claim relationship;

adjusting claims when selected, added, or deleted, wherein all other claims will be automatically be adjusted and renumbered; and checking the claims for antecedent and support in drawings and support in description; and indexing terms in the claims, along with automatically detecting and displaying a claim number from a claim text and claim status as independent claim type or dependent claim type; and generating a diagnostic message for the claim tree showing inter-claim relationship between descendant and parent claims.

11. An intellectual property (IP) system, comprising:

a plurality of workstations serving IP specialists each adapted to receive a patent document and to provide value added services;

a server coupled to the user workstations over the Internet, the server executing a patent analyzer, including:

code to generate and displaying a claim tree showing inter-claim relationship between descendant and parent claims;

code to utilize an interface so that when a user selects a claim a graphical representation of the inter-claim relationship IS diagrammed;

code to move claims when requested by the user, the claim tree visualizes and inter-claim relationship, wherein moving the claim by using drag and drop selection the claims will automatically be renumbered to show their new inter-claim relationship;

code to adjust claims when selected, added, or deleted, wherein all other claims will be automatically be adjusted and renumbered; and code to check the claims for antecedent and support in drawings and support in description; and code to index terms in the claims, along with automatically detecting and displaying a claim number from a claim text and claim status as independent claim type or dependent claim type; and code to identify broader and narrower terms, and prompt a user whether a predetermined element is necessary or whether the predetermined element is not needed in a design around.

12. The IP system of claim 11, further comprising code to automatically generate specification based on one or more figures, comprising code to:

extract name of element and relationship to other elements in the figure;

prompt a user to textually describe the operation of element and relationship of element to other elements;

prompt the user to textually describe the operation of the group of elements in combination; prompt the user to textually describe the operation of the figure as a whole;

check for conformance to claim language and Section 112 requirements;

prompt the user to generate claims by identifying major elements for the claim and for each element, generating dependent claims covering potential substitutes or actual elements required to implement the invention;

prompt a user to refine the claim with code to:
  a. select one or more elements that can be omitted from a commercial product;
  b. substitute an element with another that performs the element's function but is physically different from the element; and
  c. determine if the element can be changed to function in a different way while producing the same result; check for best mode; and generate a filing fee estimate based on the number of claims.

13. The IP system of claim 11, further comprising:

code to describe a hypothetical product;

code to draft one or more claims to cover the hypothetical product in view of the prior art; and code to performs infringement analysis by reading the claim on the hypothetical product.

14. The IP system of claim 11, further comprising:

code to generates a listing of elements all elements used in the drawings;

code to check that elements recited in the claims appear in the drawings;

code to check if an element number is associated with two or more different element names;

code to automatically generate a summary of the invention and an abstract; and code to automatically generate an information disclosure statement (IDS) based on the known prior art.

15. The IP system of claim 11, further comprising:

code to display claim elements as interconnected boxes showing element relationship, wherein the user edits the claim element by editing text in the box.

* * * * *